B. D. EMANUEL.
SCALE.
APPLICATION FILED MAY 21, 1908.

No. 902,953.

Patented Nov. 3, 1908.

2 SHEETS—SHEET 1.

WITNESSES:
J. H. Swan
O. M. Greener

INVENTOR.
Benjamin D. Emanuel.
BY
V. H. Lockwood
ATTORNEY.

B. D. EMANUEL.
SCALE.
APPLICATION FILED MAY 21, 1908.
902,953.  Patented Nov. 3, 1908.
2 SHEETS—SHEET 2.
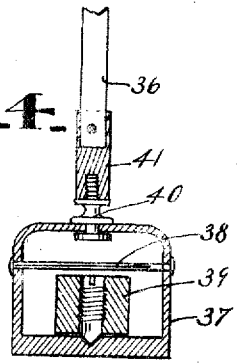
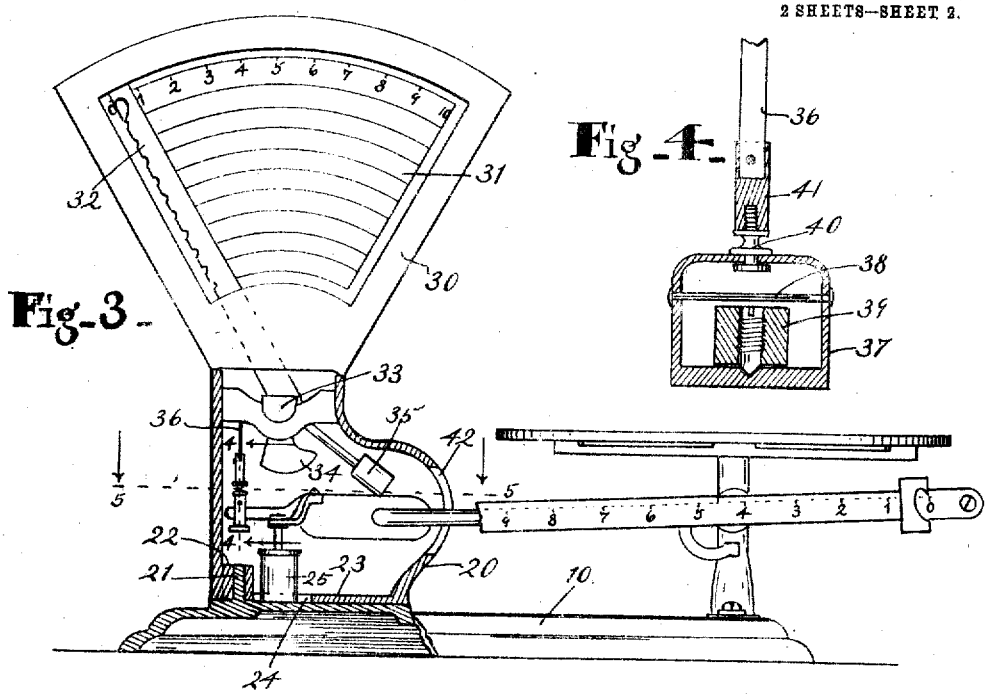
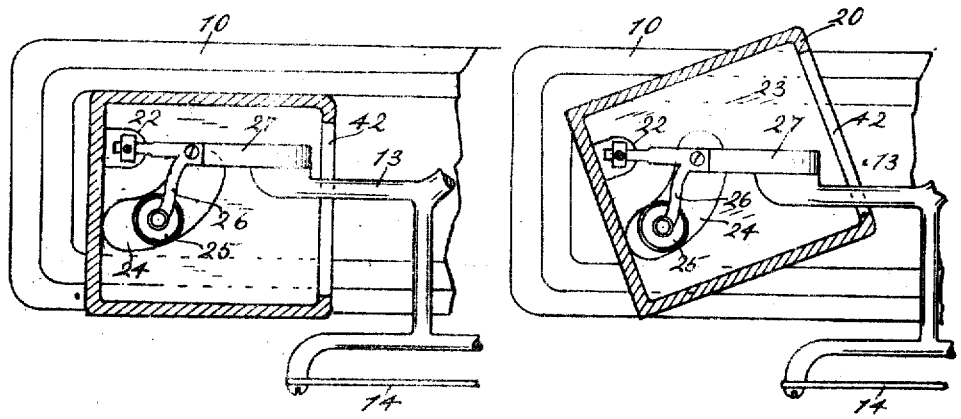
WITNESSES:
J. H. Swan
O. M. Greener
INVENTOR.
Benjamin D. Emanuel.
BY
V. H. Lockwood
ATTORNEY.

UNITED STATES PATENT OFFICE.

BENJAMIN D. EMANUEL, OF ANDERSON, INDIANA.

SCALE.

No. 902,953.   Specification of Letters Patent.   Patented Nov. 3, 1908.

Application filed May 21, 1908. Serial No. 434,031.

*To all whom it may concern:*

Be it known that I, BENJAMIN D. EMANUEL, of Anderson, county of Madison, and State of Indiana, have invented a certain new and useful Scale; and I do hereby declare that the following is a full, clear, and exact description thereof, reference being had to the accompanying drawings, in which like letters refer to like parts.

The object of this invention is to improve the construction of computing scales, especially of the pendulum type, in order that the housing and chart casing may readily be adjusted upon the base at the desired angle. Users of such scales are required to locate them in various situations in their stores and yet in all situations it is desirable that the housing be turned at such an angle that the chart will face the operator in the position that he must occupy according to the situation of the scale with reference to the counter and other objects in the store and with reference to the light.

To that end one feature of the invention consists in mounting the housing on the base so it may be horizontally oscillated thereon and adjusted to various positions without in any manner interfering with the operations of the scale beam or other parts of the device. To this end the housing is fulcrumed on an upwardly extending pin from the base that is in substantially vertical alinement with the connection between the rear end of the scale beam and the actuating means above, so that to whatever position the housing may be oscillated, the relative positions of the scale beam, actuator and connecting means will be consistently maintained. Also, to that end it is desirable to provide a dash-pot construction which is movable and which will not interfere with the oscillating movement of the housing.

Figure 1:
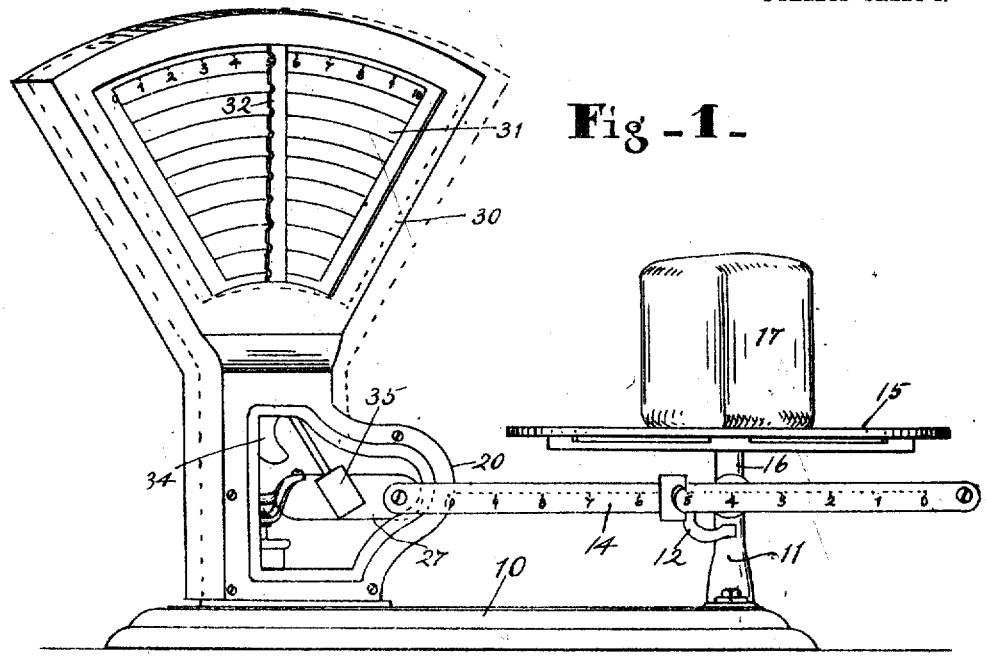
Figure 2:
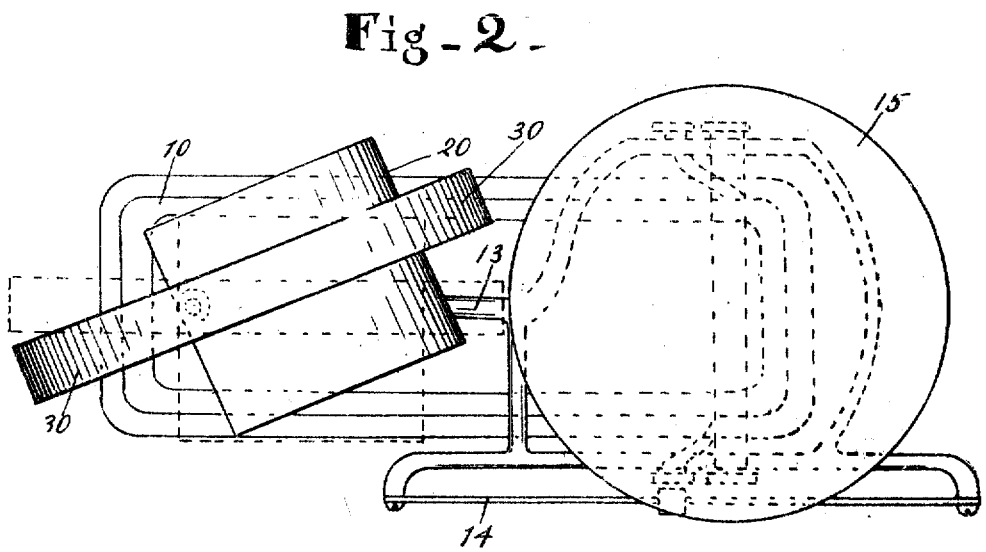

The full nature of my invention will be understood from the accompanying drawings and the following description and claims:

In the drawings Figure 1 is a front elevation of such a scale with the housing set at an acute angle with reference to the platform. Fig. 2 is a plan view of what is shown in Fig. 1, but with the load removed, an altered position of the housing being indicated by dotted lines and the position of hidden parts being also shown by dotted lines. Fig. 3 is a side elevation of the scale with the housing shown in alinement with the platform support and the lower part thereof and the adjacent parts of the base in vertical section, parts being broken away. Fig. 4 is a vertical section on the line 4—4 of Fig. 3, showing a part of the connection between the inner end of the scale beam and the indicator above. Fig. 5 is a horizontal section on the line 5—5 of Fig. 3, showing the housing in alinement with the platform support. Fig. 6 is the same as Fig. 5 with the housing turned at an angle, substantially as shown in Figs. 1 and 2.

In detail, the scale herein has a base 10 with a post 11 having an arm 12 on which a scale beam 13 is fulcrumed, said scale beam having secured to it a tare beam 14. The platform 15 is carried by a platform support 16 that is pivotally mounted on the scale beam outside its fulcrum, that is, the scale beam is fulcrumed between the platform support and the inner end of the scale beam, according to the first principle of leverage. A load 17 is shown on the platform in Fig. 1.

A housing 20 rests upon the base 10 so as to be horizontally oscillatory and adjustable about the pivot pin 21 that extends upwardly from the base and fits in a bearing 22, forming a part of the casing 20. The bottom 23 of the casing 20 has a slot 24 in it concentric with the pivot 21, through which the dash pot 25 extends. Said dash pot is secured on a base and at its upper end is connected with the arm 26 from the weighted inner end 27 of the scale beam 13 and which forms a part of said scale beam. This arrangement enables the housing to be adjusted to different horizontal positions, as shown in Figs. 5 and 6, without interfering with the dash pot.

The chart casing 30 extends upwardly from and forms really a part of the housing 20 in which the chart 31 is located. Over the face of this chart the indicator 32 moves, said indicator being mounted on a shaft 33 that has a counter-weight 34 and pendulum 35. From the indicator shaft a steel ribbon 36 extends downwardly that forms a part of the connection with the inner end of the scale beam. The lower part of this connection, as shown in Figs 3 and 4 is swiveled, it consisting of a stirrup 37 with a horizontally extending rod 38 therethrough between which and the bottom of the stirrup the inner end of the scale beam lies. A pin 40 is loosely pivoted in the upper part of the stirrup so the stirrup can turn thereon and said pin is connected by a block 41 with this strip 36. The construction is such that the weighted end 27 of the scale beam always weights and draws down upon the said connection between the scale beam and the indicator shaft, so as to tend to hold the indicator at zero or to move it towards zero and also to hold the pendulum 35 in a normally raised position. When the load is applied, the weighted end of the scale beam is correspondingly relieved and moves upwardly, whereupon the pendulum 35 descends and moves the indicator across the face of the chart to the desired indication thereon.

The pin 21, or in other words, the pivotal connection between the base and the housing, is located under and in vertical alinement with the connection between the inner end of the beam and the indicator above, so that to whatever position the housing may be turned and adjusted, the said connection between the scale beam and the indicator will in no wise be altered or affected. The housing is provided with a horizontal slot 42 through which the scale beam extends and which permits said horizontal oscillation of the housing.

What I claim as my invention and desire to secure by Letters Patent is:

1. A scale including a base, a housing horizontally oscillatable and adjustable on said base, an indicator mounted in the upper part of said housing, a scale beam projecting into said housing, and a connection between said scale beam and indicator for controlling the latter, whereby the housing may be horizontally adjusted on the base to different positions.

2. A scale including a base, a housing horizontally oscillatable on the base, an indicator mounted in the upper part of the housing, a scale beam projecting into the housing, and a vertically disposed connection between the indicator and the scale beam, whereby the indicator is controlled by the scale beam, the pivotal connection between the base and housing being under and in vertical alinement with said connection, whereby the connection between the lever and indicator will not be affected by any horizontal oscillations and adjustments of the housing.

3. A scale including a base, a housing horizontally oscillatable on the base and having a bottom plate with a slot therein, a dash pot on the base extending up through said slot, an indicator mounted in the upper part of said housing, a scale beam projecting into said housing and connected with said dash pot, and a connection between said scale beam and indicator for controlling the latter, whereby the housing may be adjusted without interfering with the dash pot.

In witness whereof I have hereunto affixed my signature in the presence of the witnesses herein named.

BENJAMIN D. EMANUEL.

Witnesses:
JAMES D. HOPPER,
LUELLA COSTELLO.